Nov. 23, 1971    J. C. KINLEY ET AL    3,621,548
BROACH FOR WELL PIPE
Filed Feb. 2, 1970    2 Sheets-Sheet 1
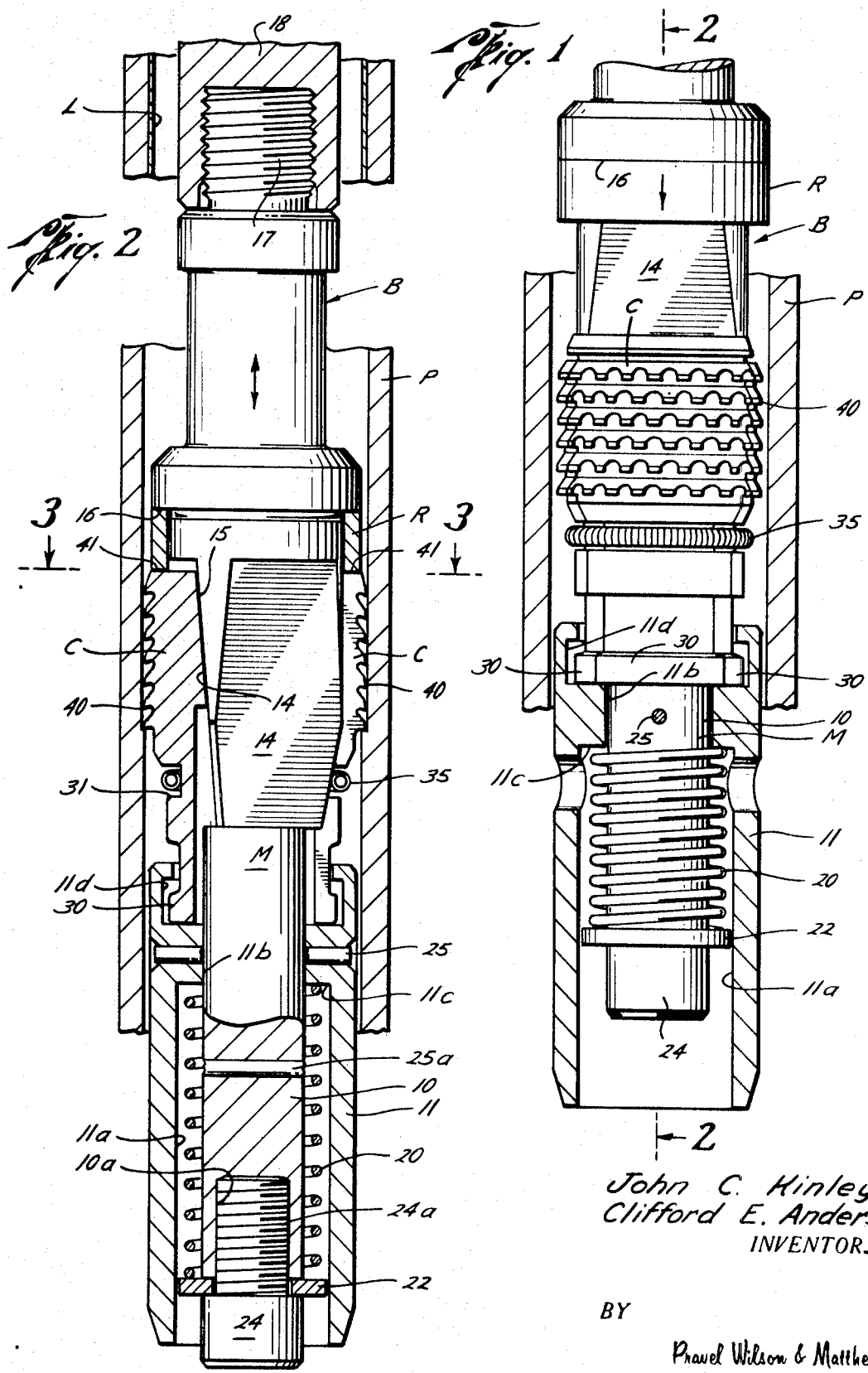
John C. Kinley
Clifford E. Anderson
INVENTORS
BY
Pravel, Wilson & Matthews
ATTORNEYS

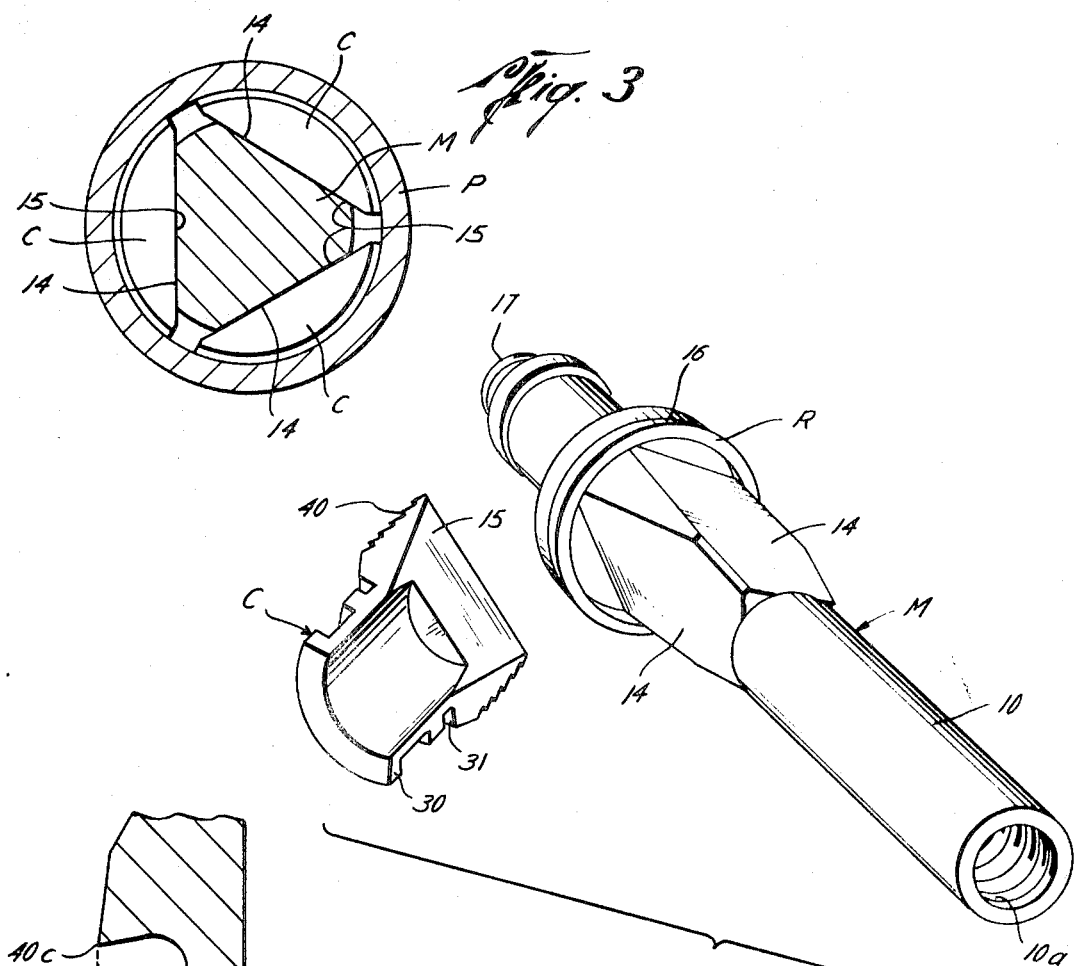
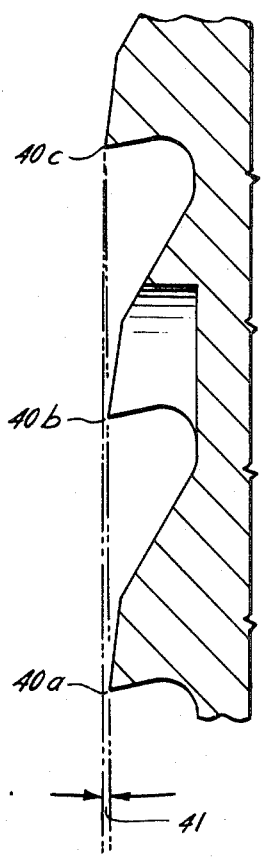

United States Patent Office 3,621,548
Patented Nov. 23, 1971

3,621,548
BROACH FOR WELL PIPE
John C. Kinley, 5815 Royalton St., Houston, Tex. 77036, and Clifford E. Anderson, Houston, Tex.; said Anderson assignor to said Kinley
Filed Feb. 2, 1970, Ser. No. 7,512
Int. Cl. B26d 1/04
U.S. Cl. 29—95.1                                                   11 Claims

ABSTRACT OF THE DISCLOSURE

A broach for cutting a portion of the inside surface of a well pipe or an object extending into a well pipe, wherein the broach is adapted to be lowered through a restriction in the pipe, thereafter expanded below the restriction for effecting the enlargement, and then passed upwardly through the restriction for withdrawal from the pipe.

BACKGROUND OF THE INVENTION

The field of this invention is broaches for performing cutting operations on the inside of a well pipe, or on objects extending into the pipe.

In carrying out the installation of liners in well pipe in accordance with U.S. Pat. No. 3,489,220, it is highly desirable, and often necessary, to have a substantially uniform inside diameter in the portion of the pipe to receive the liner. It has been found that some well pipe such as "Hydril" pipe often has a portion thereof near the joint which is smaller than the nominal inside diameter of the rest of the pipe. Also, a pipe may have a perforator button extending into the interior of the pipe. Sometimes a hanging chip, burr, or piece of metal or scale on the pipe is found projecting into the interior of the pipe. A pipe may be mashed or squeezed out of round.

It may be necessary to withdraw other oil tools, already in the well, up through the liner after it is installed, and if even a small part of the portion of the pipe to receive the liner has an obstruction, such as a slightly decreased diameter, or such as a projection, the thin liner after it is installed will have a similar obstruction, and will prevent such withdrawal. Therefore, any of the foregoing conditions would interfere with the passage of tools through the liner in the pipe. There also may be other circumstances in which it is desirable or necessary to broach or cut on the inside surface of a well pipe, or on an object projecting into the pipe.

Restrictions, such as landing nipples, are often found in well pipe above the portion of the pipe wherein the broaching or cutting is needed. So far as is known, no device has been available prior to this invention which was capable of being passed through a restriction, thereafter expanded for performing cutting operations in the pipe below the restriction, and then collapsed for positive and certain withdrawal upwardly through the restriction.

SUMMARY OF THE INVENTION

The present invention relates to a broach which is adapted to be lowered in a well pipe so as to pass through a restriction, and thereafter is expanded to cut the metal of the pipe or an object extending into the interior of the pipe. The inside diameter of the pipe may be enlarged so that it has substantially the same internal diameter throughout a desired length, whereby a liner may be subsequently installed therein in accordance with U.S. Pat. No. 3,489,220.

The broach is preferably lowered on a flexible line and is capable of being retracted in diameter after the broaching operation to pull the broach upwardly through the restriction for removing the broach from the well pipe. The maximum cutting diameter of the broach may be increased using replaceable stop rings with the broach so as to control the increase in the amount of cutting on the inside of the pipe.

BRIEF DESCRIPTION OF THE DRAWING

FIG. 1 is an elevation, partly in section, of the broach of this invention in the retracted position for running into the well pipe;

FIG. 2 is an elevation, partly in section, of the broach of this invention, taken on line 2—2 of FIG. 1, and illustrating the broach in the cutting position in the well pipe;

FIG. 3 is a cross-sectional view taken on line 3—3 of FIG. 2;

FIG. 4 is an exploded view of a portion of the broach of this invention to illustrate specific details thereof; and FIG. 5 is an enlarged view of a portion of one of the cutting elements, in vertical section, to illustrate the relationship of the teeth of each cutting element.

DESCRIPTION OF THE PREFERRED EMBODIMENTS

In the drawings, the letter B designates generally the broach of this invention which is adapted to be lowered into a well pipe P for the purpose of cutting a portion of the inside surface thereof to enlarge the inside diameter of the pipe P. Such inside diameter of the pipe P may be nonuniform in a portion which is to receive a liner in accordance with U.S. Pat. No. 3,489,220, and therefore, with the broach B of this invention, the inside diameter of the pipe P may be made uniform throughout the length which is to receive the liner. There may be other instances when it is desirable to cut all or a portion of the inside diameter of a well pipe P, and the present broach B of this invention may be used for any such purpose. It is also significant to note that the broach B of this invention is adapted to pass through a landing nipple L or any other restriction in the inside diameter of the pipe P (FIG. 2) so as to get below the restriction L for enlarging the diameter of the pipe P at a point therebelow. Additionally, after the broach B has accomplished its cutting operation within the pipe P, it may be withdrawn through the restriction L.

Considering the invention more in detail, the broach B includes a mandrel M (FIGS. 1, 2, 3 and 4). The mandrel M has a lower portion 10 which is adapted to extend into the bore 11a of a broach body 11 (FIGS. 1 and 2).

The mandrel M has a plurality of upwardly and outwardly tapered or inclined surfaces 14, usually three in number. The number of cutting elements C corresponds to the number of surfaces 14. Each cutting element C has a tapered surface 15 in contact with the tapered surface 14 opposite thereto for the purposes to be hereinafter described.

Above the expander surfaces 14 on the mandel M, there is an annular shoulder 16 which is adapted to receive a removable stop ring R, as will be explained. The upper end of the mandrel M preferably has external threads 17 for providing a threaded connection to a coupling 18 for thereby connecting the broach B to the usual jar, stem and rope socket (not shown) and thence to a suitable lowering line, which in the usual instance, is a flexible wire line.

In the preferred form of the invention, the broach body bore 11a is of a larger diameter than the external diameter of the lower portion 10 of the mandrel M so as to receive a coil spring 20 therebetween. A smaller diameter bore or passage 11b is provided near the upper end of the body 11 and it is only slightly larger than the diameter of the lower portion 10 of the mandrel M so as to serve as a guide for the longitudinal movement of the lower mandrel portion 10 during its longitudinal movement relative to the body 11, as will be more evident hereinafter. Also, the reduced bore 11b provides for a shoulder 11c which is engaged by the upper end of the coil spring 20. The lower end of the coil spring 20 is confined in engagement with a removable washer 22 which is removably secured to the lower end of the mandrel M by a removable bolt or screw 24. The bolt or screw 24 preferably has external threads 24a which are threaded into a threaded opening 10a in the lower mandrel portion 10 (FIGS. 2 and 4). When the cutters C are in the retracted position of FIG. 1, the spring 20 is compressed between the shoulder 11c and the washer or flange 22, and the spring 20 is held in such compressed condition by a shear pin 25 which extends through the lower mandrel portion 10 and also through the broach body 11. When the pin 25 is sheared, a central portion 25a is left in the mandrel portion 10, and the spring 20 acts to urge the mandrel M longitudinally relative to the body 11. Assuming the mandrel M does not move after shearing the pin 25, which is generally the case, the spring 20 serves to move the housing or body 11 upwardly relative to the mandrel M.

The cutting elements C together form a substantially complete cylinder, so that the arcuate portion of each of the cutting elements C is a portion of the cylinder, the extent of which depends upon the number of cutting elements C which are utilized. When three of the cutting elements C are utilized, each cutting element C is approximately one-third of a cylinder, and the cutting elements C are preferably identical to each other. Thus, referring in particular to FIG. 4, each cutting element C has a lower external arcuate flange 30 which is adapted to be confined within an annular recess 11d (FIGS. 1 and 2) of the broach body 11. The internal diameter of the recess 11d is larger than the external diameter of the flanges 30 when they are in the retracted position (FIG. 1) so that upon a radial outward movement of the cutting elements C, the flanges 30 are still confined by the recess 11d, but outward movement thereof is not prevented.

Each of the cutting elements C is also provided with an arcuate groove 31 so that when the cutting elements C are assembled on the mandrel M, they are adapted to be urged radially inwardly by a circular spring 35. The spring 35 holds the cutting elements C so that the inner tapered surfaces 15 are constantly engaged with the tapered expander surfaces 14, even though there is relative longitudinal movement therebetween, as will be explained.

Each of the cutting elements C has a plurality of rows of cutting teeth 40. A portion of such teeth 40 are shown in an enlarged fragmentary view in FIG. 5 to illustrate the preferred arrangement for such teeth 40. Thus, as seen in FIG. 5, the teeth 40a, 40b and 40c have progressively larger diameters so that as the cutting elements C are moved downwardly in contact with the inside surface of the pipe P, the extent of cutting is indicated by the space 41 (FIG. 5) between the arrows shown therein. The tips of the teeth 40 may be made of tungsten carbide or the teeth may be otherwise suitably hardened to more effectively accomplish the cutting of the inside surface of the pipe 40, which is represented in FIG. 2.

In the operation or use of the broach B, the broach B is lowered on a flexible line or any other suitable support which extends upwardly from the connector 18 and thus upwardly from the broach B. The cutting elements C are retracted so that they do not extend substantially outwardly of the external surface of the body 11 so that the broach B can pass through any restriction such as the landing nipple L in the pipe P so long as the body 11 can pass therethrough.

During the lowering of the broach B, the cutting elements C are confined in the retracted position of FIG. 1 by the resilient spring 35, and the mandrel M is releasably held to the body 11 by the shear pin 25. The broach B is lowered until it engages a stop in the pipe P. Such stop may be of any conventional construction and is positioned in the pipe P prior to lowering the broach B therein.

When the lower end of the body 11 contacts the stop, the shear pin 25 may be thereafter sheared by manipulating suitable well jars with the wire line supporting the broach B, or by any other suitable means for applying a jarring force to the shear pin 25.

Upon a shearing of the pin 25, the spring 20 is released from its compressed position and it moves to its expanded position, which causes a relative movement between the mandrel M and the body 11. Normally, the mandrel M does not move, but the body 11 moves upwardly relative to the mandrel M. As the body 11 moves upwardly relative to the mandrel M, the cutting elements C move upwardly with the body 11 relative to the expander surfaces 14, which causes the cutting elements C to be forced radially outwardly towards the cutting position. Ultimately, the cutting teeth 40 on the cutting elements C engage the inside surface of the pipe P.

Thereafter, the broach B may be raised with the wire line or other suitable support to the top of the point in the pipe P which is to be enlarged or cut by the cutting elements C. Then, the broach B is forced or driven downwardly, preferably using wire line jars (not shown), so that the downwardly facing cutting teeth 40 engage the inside surface of the pipe P and cut the metal therefrom. Normally, only a small amount of the metal is cut from the pipe P at any one time and therefore a number of downward cutting strokes are required before the cutting elements C are fully expanded to the maximum cutting position shown in FIG. 2, wherein the upper ends 41 of the cutting elements C engage the lower edge of the ring R. When such contact occurs, the cutting elements C cannot move any further outwardly since no further relative longitudinal movement between the cutting elements C and the expander surfaces 14 can occur.

Thus, using a ring R of a predetermined vertical thickness or height, a predetermined cutting diameter for the cutting elements C may be obtained. After the maximum cutting position for the cutting elements C is reached with a particular stop ring R, the stop ring R may be replaced by a stop ring which has a shorter vertical thickness or height so that the cutting elements C can move upwardly relative to the expander surfaces 14 a greater amount and thus can move to a greater external diameter, than with the original ring R in place.

In order to control the extent of the cutting of the pipe P so that an excessive cutting is avoided, three or four of the rings R of different vertical heights may be employed in a single operation. It will be appreciated that the broach B must be removed from the well pipe P and the broach B must then be disassembled to replace the ring R. By using rings R of successively shorter vertical thickness, the external diameter of the cutting elements C may be gradually increased. It should be noted, however, that the amount of metal removed from the inside of the pipe P is relatively small under normal circumstances. For example, the vertical heights of the ring R may vary so that each ring permits only a change of one hundredth of an inch in the maximum cutting diameter of the cutting elements C. Normally, the maximum metal which is removed from the inside of the pipe P will not be greater than four one hundredths of an inch in diameter, which amounts to approximately two hundreds of an inch in actual thickness of metal.

When the broach B is to be removed after the cutting elements C have been manipulated for the cutting action and have normally reached their maximum cutting position, the broach B is pulled upwardly with the wire line or other suitable support. As the cutting elements C pass through the restriction such as the landing nipple L in the well pipe P, the engagement of the cutting teeth 40 with the restriction L causes the cutting teeth C to be forced downwardly on the expander surfaces 14 to thereby cause a compression of the spring 20 so that a reduced external diameter is acquired by the cutting elements C. The spring 35 of course acts to pull the cutting elements C inwardly as the inclined surfaces 15 of the cutting elements C move downwardly relative to the expander surfaces 14. Thus, the cutting elements C are retracted, and may reach approximately the position shown in FIG. 1 due to their contact with the inside of the restriction L as they are pulled upwardly therethrough. Since the cutting teeth 40 are directed downwardly, no cutting action occurs as the cutting elements 40 are pulled through the restriction L.

When the broach B is removed to the surface for the replacement of the ring R with a similar ring of a shorter vertical thickness, the apparatus is disassembled to replace such ring R, and ultimately it is reassembled with the spring 20 compressed (FIG. 1) and a new shear pin 25. Then the broach B is run back into the pipe P as shown in FIG. 1, and is again released to the cutting position of FIG. 2. Such operations may be repeated as often as desired.

Although the invention has been described in detail for the enlargement of the diameter of the pipe P for the installation of a liner, the cutter C may also be used for other purposes such as cutting off a perforator button which is extending into the pipe P, or for cutting off a hanging chip, burr or other piece of metal or scale in the tubing or pipe P. Also, the broach B may be used for cutting the inside of a pipe which has been mashed or squeezed out of round so as to restore the inside bore to at least the original size, or to some predetermined drift diameter. Thus, the broach B is suitable for many uses in a pipe P wherein cutting action is desired on the pipe or any object extending into the inside of the pipe.

The foregoing disclosure and description of the invention are illustrative and explanatory thereof, and various changes in the size, shape, and materials as well as in the details of the illustrated construction may be made without departing from the spirit of the invention.

We claim:

1. A broach for performing cutting operations in a portion of a well pipe below a restriction in the pipe, comprising:
   a broach body;
   a plurality of cutting elements;
   mounting means for mounting said elements on said broach body for outward lateral movement from a retracted position to a cutting position;
   expander means for urging said elements outwardly to said cutting position upon relative longitudinal movement between said cutting elements and said expander means; and
   releasable latch means for preventing relative longitudinal movement between said expander means and said cutting elements until released, whereby said cutting elements are prevented from being urged from the retracted position to the cutting position until the latch means is released.

2. The structure set forth in claim 1, including:
   means for urging said elements towards said retracted position.

3. The structure set forth in claim 1, including:
   resilient means for urging said cutting elements and said expander means longitudinally relative to each other after said latch means has been released.

4. The structure set forth in claim 3, wherein:
   said resilient means is adapted to be compressed upon an upward movement of said mandrel relative to said cutting elements, whereby the cutting elements may move towards said retracted position for the withdrawal of the broach from the pipe through the restriction therein.

5. The structure set forth in claim 1, wherein:
   said cutting elements in said retracted position does not extend substantially beyond the external surface of said broach body to thereby facilitate lowering of the broach through the restriction in the pipe.

6. The structure set forth in claim 1, wherein:
   each of said cutting elements has downwardly depending cutting edges adapted to engage the inside surface of the pipe for cutting some of that surface away during each downward stroke of the broach.

7. The structure set forth in claim 1, including:
   stop means to limit the extent of relative longitudinal movement between said cutting elements and said expander means to thereby limit the outer diameter of said cutting elements in their maximum cutting position.

8. The structure set forth in claim 7, wherein:
   said stop means is replaceable to vary the limit of the outer diameter of said cutting elements in their maximum cutting position.

9. The structure set forth in claim 7, wherein:
   said stop means is a ring which is removably mounted above said expander means, whereby rings of different vertical thickness may be utilized as said stop means.

10. A broach for performing cutting operations on the inside of a well pipe, comprising:
    a broach body having a hollow bore;
    a mandrel having a lower portion adapted to extend into said bore of said body for longitudinal movement relative thereto;
    said mandrel having a plurality of tapered expander surfaces thereon above said lower portion;
    a plurality of cutting elements mounted outwardly of said expander surfaces of said mandrel and connected to said body for movement therewith;
    resilient means operably engageable with said mandrel and said body for urging said cutting elements and said expander surfaces longitudinally relative to each other for effecting outward movement of said elements relative to said mandrel and
    releasable latch means connecting said mandrel to said body for releasably holding same to prevent said resilient means from causing relative longitudinal movement between said expander surfaces and said cutting elements but being releasable to permit such relative longitudinal movement for thereby causing said expander surfaces to urge said cutting elements outwardly.

11. The structure set forth in claim 10, including:
    a stop ring mounted on said mandrel above said expander surfaces for engagement by said cutting elements to limit the extent of outward radial movement of the cutting elements.

References Cited

UNITED STATES PATENTS

| | | | |
|---|---|---|---|
| 2,121,888 | 6/1938 | Smith | 29—105 X |
| 2,777,191 | 1/1957 | Eklund | 29—95.1 |
| 2,814,094 | 11/1957 | Hanna | 29—95.1 |
| 2,940,522 | 6/1960 | Taylor et al. | 29—105 A |
| 2,943,383 | 7/1960 | Anthony et al. | 29—95.1 |
| 3,339,255 | 9/1967 | Mefferd | 29—95.1 |

HARRISON L. HINSON, Primary Examiner